United States Patent Office 3,804,940
Patented Apr. 16, 1974

---

3,804,940
METHOD OF SEPARATING THORIUM FROM YTTRIUM AND LANTHANIDE RARE EARTHS
George W. Mason, Clarendon Hills, Sonia Lewey, Joliet, and Donald F. Peppard, Oak Park, Ill., assignors to the United States of America as represented by the United States Atomic Energy Commission
No Drawing. Filed Oct. 26, 1972, Ser. No. 301,035
Int. Cl. B01d 11/00; C01g 56/00
U.S. Cl. 423—10
10 Claims

ABSTRACT OF THE DISCLOSURE

Thorium values are separated from yttrium and from the lanthanide rare earth values contained in an aqueous hydrochloric acid solution with an organic extractant of di(2-ethylhexyl) phosphoric acid in 2-ethylhexanoic acid which preferentially extracts the thorium values while the yttrium and lanthanide rare earth values remain in the aqueous solution. The thorium values are recovered by contacting the thorium-loaded extractant with a 4.0 to 8.0 M hydrochloric acid solution.

CONTRACTUAL ORIGIN OF THE INVENTION

The invention described herein was made in the course of, or under, a contract with the U.S. Atomic Energy Commission.

BACKGROUND OF THE INVENTION

This invention relates to a method of separating thorium from yttrium and from the lanthanide rare earths.

As the number of nuclear power reactors continues to increase, the need for fuel to power these reactors becomes more critical. Although there are at present apparently sufficient uranium reserves to meet the needs of these reactors, long-range planning requires that other fuel sources be developed.

Thorium is of interest as a fuel in several types of reactors presently under development. For example, it is being considered as a back-up fuel to uranium and plutonium in the Liquid Metal Fast Breeder Reactor (LMFBR) program, and the High Temperature Gas Reactor (HTGR) would normally use thorium as a part of its fuel.

The average concentration of thorium in the earth's crust is estimated at 12 parts per million, making it about three times as abundant as uranium. As found in nature, thorium is contained chiefly as a minor constituent in minerals. Often associated with thorium in these minerals are uranium, iron, calcium, rare earths and phosphates. Recovery of the thorium from these minerals is difficult and frequently results in the rare earths and thorium being recovered together. It is then necessary to separate the thorium from the rare earths.

One of the best and most widely used extractants for purifying thorium and separating thorium from the rare earths is di(2-ethylhexyl) phosphoric acid (HDEHP). Unfortunately, this extractant has such a high affinity for thorium that back-extraction is difficult unles one uses a very low extractant concentration. This, of course, results in very low efficiency and greatly increases separation costs. Another process using HDEHP recovers the extracted thorium values by precipitating the thorium as the insoluble fluoride or sulfate salt. However, the reported results showed rather substantial losses of thorium and this process also requires that the precipitant be further processed to recover the purified thorium values.

SUMMARY OF THE INVENTION

We have found that, by making the aqueous feed solution containing the thorium, yttrium and lanthanide rare earth values to be dissolved in 0.4 to 4.0 M in hydrochloric acid and by diluting di(2-ethylhexyl) phosphoric acid (HDEHP) in 2-ethylhexanoic acid, we are able to use higher concentrations of HDEHP, thereby extracting more thorium with each contact, obtain excellent separation factors of thorium from yttrium and from the rare earths and yet easily and readily back-extract the thorium values from the organic extractant without resorting to precipitation or other more complicated chemical separation techniques.

It is therefore one object of this invention to provide a method for separating thorium values from yttrium and the rare earth values.

It is another object of this invention to provide a method for separating thorium values from yttrium and the rare earths using HDEHP as the extractant.

It is a further object of this invention to provide a method for separating thorium from yttrium and the rare earths using HDEHP as the extractant in which the thorium can be readily recovered from the extractant.

Finally, it is an object of this invention to provide a method for separating thorium values from yttrium and the rare earth values which is both effective and economical.

DESCRIPTION OF THE PREFERRED EMBODIMENT

These and other objects may be met by adjusting the aqueous solution containing the thorium, yttrium and lanthanide rare earth values to about 1.0 M hydrochloric acid to form a feed solution, contacting the feed solution with an organic extractant containing about 0.3 F HDEHP in 2-ethylhexanoic acid whereby the thorium values are extracted into the organic extractant while the yttrium and rare earth values remain in the aqueous feed solution; separating the organic extractant from the feed solution and contacting the thorium-laden organic extractant with an aqueous solution of 6.0 M hydrochloric acid whereby the thorium values are back-extracted from the organic extractant.

The aqueous feed solution may be prepared by dissolving the thorium, rare earth and yttrium values as their chloride salts in water or by dissolving these values as soluble compounds in a solution of hydrochloric acid. After dissolution of the values, the solution should be adjusted to from about 0.4 to about 4.0 M in hydrochloric acid, although a hydrochloric acid concentration of about 1.0 M is preferred.

In general, the concentration of HDEHP in the 2-ethylhexanoic acid diluent may vary from about 0.1 to 1.0 F, although about 0.3 F is preferred. Concentrations less than this will extract very little thorium, since four moles of extractant are required for each mole of thorium to be extracted. Higher concentrations of extractant may prevent complete back-extraction of the thorium values from the organic extractant because of the high affinity of the extractant for thorium under these conditions. In addition, at the higher concentrations, the extractant becomes increasingly viscous which may cause phase separation problems. ("F" is a symbol to indicate formality, which means that one liter contains as many grams of extractant as the formula indicates, disregarding any polymerization or dissociation that may take place.)

Although thorium about 99% pure of yttrium and rare earths can be obtained by the method of this invention, the purity of the thorium can be improved by scrubbing the organic extractant, prior to back-extracting the thorium values, to remove the small quantities of yttrium and rare earths which will co-extract with the thorium. This is readily accomplished by contacting the thorium-laden organic extractant with an aqueous scrub solution which is preferably 1.0 M in hydrochloric acid, although it may range from 0.4 to 4.0 M in hydrochloric acid.

The thorium values can be readily back-extracted by contacting the thorium-laden organic extractant with an aqueous solution containing 4.0 to 8.0 M hydrochloric acid, although a solution containing 6.0 M is preferred.

The extraction temperature is not critical and may be carried out over a wide range wherein the feed solution and extractant solutions are both liquid, although room temperature, approximately 25° C., was found to be very satisfactory. In general, contact times are not critical, although three minutes was found satisfactory to insure thorough phase mixing. The actual extraction operation can be carried out in batch or continuous operation, using, for example, simple mixing tanks, mixer settlers, direct or countercurrent flow columns, centrifugal contactors or other similar conventional type equipment known to one skilled in the art.

The following example is given as illustrative of the process of this invention and is not to be taken as limiting the scope or extent of the invention.

Example

A feed solution, containing a known amount of thorium and yttrium and also known amounts of dysprosium, holmium, erbium, thulium, ytterbium and lutetium as representative of the lanthanide rare earths, was prepared by mixing chloride solutions of the individual elements and sufficient hydrochloric acid to make 25 ml. of a 1.0 hydrochloric acid solution.

The feed solution and three 25-ml. portions of 1.0 M hydrochloric acid scrub solution were cycled successively through two 25-ml. portions of 0.3 F HDEHP in 2-ethylhexanoic acid contained in two separatory funnels. For mixing of phases, each funnel was shaken manually for 3 minutes and allowed to settle for 3 minutes.

The two organic extractant phases were combined and contacted with four successive 25-ml. portions of 6 M hydrochloric acid for back-extraction of the thorium. The scrubs were combined and evaporated to 25 ml. for analysis.

The four aqueous product phases (feed plus three 1 M hydrochlorid acid scrubs) were combined and evaporated to 25 ml. for analysis.

Results are shown in the table.

The decontamination factor, D.F., is defined (in terms of desired product, P, with respect to contaminant, c) as:

$$P/C_{product}/P/C_{feed}$$

with $(P/C)$ ratios in terms of mass.

The choice of separations process conditions was based on radiochemical data obtained through the use of alpha-active $Th^{230}$ and beta-active $Tm^{170}$, as a representative of trivalent rare earths and yttrium.

limited by the details given herein but that it may be modified within the scope of the appended claims.

The embodiments of the invention in which an exclusive property or privilege is claimed are defined as follows:

1. A method for separating thorium values from yttrium and from lanthanide rare earth values contained in an aqueous solution comprising: adjusting said aqueous solution to from about 0.4 M to 4.0 M in hydrochloric acid to form a feed solution; contacting the feed solution with an organic extractant of di(2-ethylhexyl) phosphoric acid in 2-ethylhexanoic acid whereby the thorium values are taken up by the organic extractant and the yttrium and rare earth values remain in the feed solution; separating the organic extractant from the feed solution and recovering the thorium values.

2. The method of claim 1 wherein the thorium values are recovered by contacting the thorium-laden organic extractant with an aqueous solution containing 4.0 to 8.0 M hydrochloric acid whereby the thorium values are back-extracted into the aqueous solution.

3. The method of claim 2 wherein the organic extractant is from 0.1 to 1.0 F in di(2-ethylhexyl) phosphoric acid.

4. The method of claim 3 wherein the feed solution is 1.0 M in hydrochloric acid and the organic extractant is 0.3 F in di(2-ethylhexyl) phosphoric acid.

5. The method of claim 4 including the additional step of contacting the thorium-laden organic extractant with an aqueous scrub solution of 0.4 to 4.0 M hydrochloric acid, thereby removing any yttrium and rare earth values which may be present in the extractant.

6. In the method of separating thorium values from yttrium and from lanthanide rare earth values contained in an aqueous feed solution by contacting the feed solution with an organic extractant of di(2-ethylhexyl) phosphoric acid in an organic diluent, whereby the thorium values are taken up by the extractant, and recovering the thorium values, the improvement in the method comprising: making said aqueous feed solution about 0.4 to 4.0 M in hydrochloric acid; contacting the aqueous acid feed solution with an organic extractant of di(2-ethylhexyl) phosphoric acid in 2-ethylhexanoic acid.

7. The method of claim 6 wherein the thorium values are recovered by contacting the thorium-laden organic extractant with an aqueous solution containing 4.0 to 8.0 M hydrochloric acid whereby the thorium values are back-extracted into the aqueous solution.

8. The method of claim 7 wherein the organic extractant is 0.1 to 1.0 F in di(2-ethylhexyl) phosphoric acid.

9. The method of claim 8 wherein the feed solution is 1.0 M in hydrochloric acid and the organic extractant is 0.3 F in di(2-ethylhexyl) phosphoric acid.

SEPARATION OF THORIUM FROM RARE EARTHS AND YTTRIUM

Feed: 25 ml, 145 mg. Th, aqueous mixture of Th, Y, Dy, Ho, Br, Tm, Yb and Lu as their chlorides in 1 M HCl
Scrub: (25-ml. portions), aqueous phase 1 M HCl
Organic extractant: (25-ml. portions), 0.3 F HDEHP in 2-ethylhexanoic acid

|  | Percent yield Th | Ratio, by mass, of Th to rare earth | | | | | | |
|---|---|---|---|---|---|---|---|---|
|  |  | Th/Y | Th/Dy | Th/Ho | Th/Er | Th/Tm | Th/Yb | Th/Lu |
| Feed | | 8.1 | 4.5 | 4.4 | 4.3 | 4.3 | 4.2 | 4.1 |
| Organic product | >99 | 3.6×10⁵ | 9.7×10⁴ | 4.8×10⁴ | 9.7×10⁴ | 9.7×10⁴ | 3.6×10⁴ | 1.9×10⁴ |
| Aqueous product | <1 | 0.014 | 0.008 | 0.007 | 0.007 | 0.007 | 0.007 | 0.007 |

NOTE.—The decontamination factors for thorium with respect to rare earths and yttrium range from 4.6×10³ for lutetium to 4.4×10⁴ for yttrium. The recovered thorium product was found to be greater than 99.9% pure with respect to yttrium and rare earths. The decontamination factor for rare earths with respect to thorium was 580.

As can be seen from the above example, the process of this invention results in a very high percentage of recovery of thorium of very high purity from yttrium and the rare earths.

It will be understood that the invention is not to be

10. The method of claim 9 including the additional step of contacting the thorium-laden organic extractant with an aqueous scrub solution of 0.4 to 4.0 M hydrochloric acid, thereby removing any yttrium and rare earth values which may be present in the extractant.

(References on following page)

References Cited

UNITED STATES PATENTS

| | | | |
|---|---|---|---|
| 3,153,568 | 10/1964 | Olson et al. | 423—10 |
| 2,883,264 | 4/1959 | Warf | 423—10 |
| 3,328,116 | 6/1967 | Grinstead | 23—312 ME |
| 3,230,036 | 1/1966 | Kappelmann et al. | 423—10 |
| 3,360,346 | 12/1967 | Huet et al. | 423—10 |

FOREIGN PATENTS

| | | | |
|---|---|---|---|
| 824,396 | 11/1959 | Great Britain | 423—10 |

LELAND A. SEBASTIAN, Primary Examiner

R. L. TATE, Assistant Examiner

U.S. Cl. X.R.

252—301.1 R; 423—252